Dec. 9, 1941.   J. W. YOUNG   2,265,413
JIG AND FORM FOR USE IN CONSTRUCTING STORAGE BATTERIES
Original Filed Feb. 4, 1939   3 Sheets-Sheet 1

Inventor
John W. Young
By John E. Snyder Jr.
Attorney

Dec. 9, 1941.  J. W. YOUNG  2,265,413
JIG AND FORM FOR USE IN CONSTRUCTING STORAGE BATTERIES
Original Filed Feb. 4, 1939  3 Sheets-Sheet 2
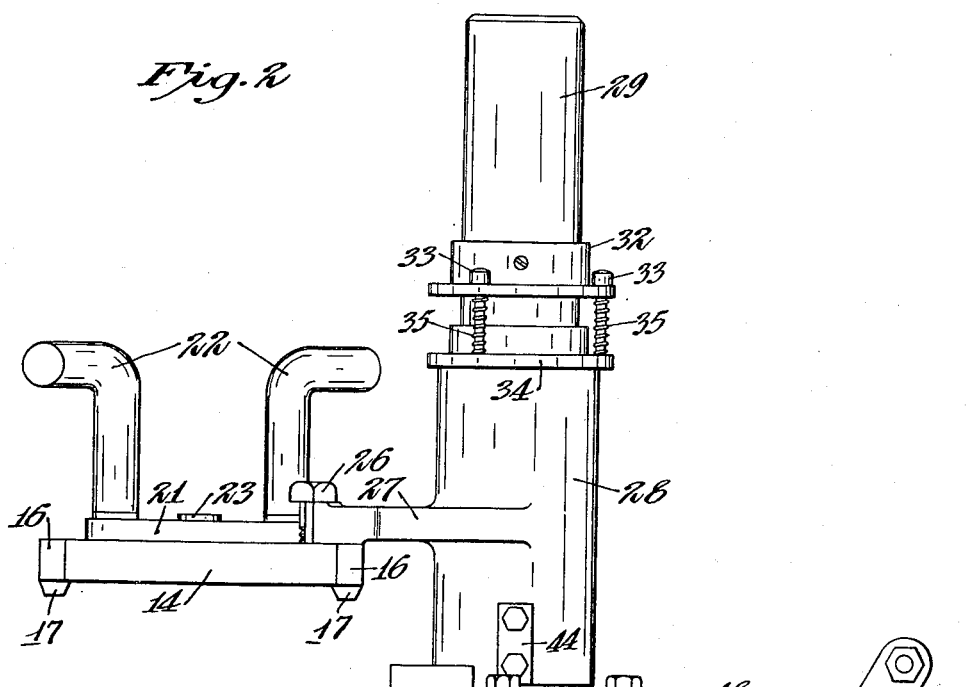
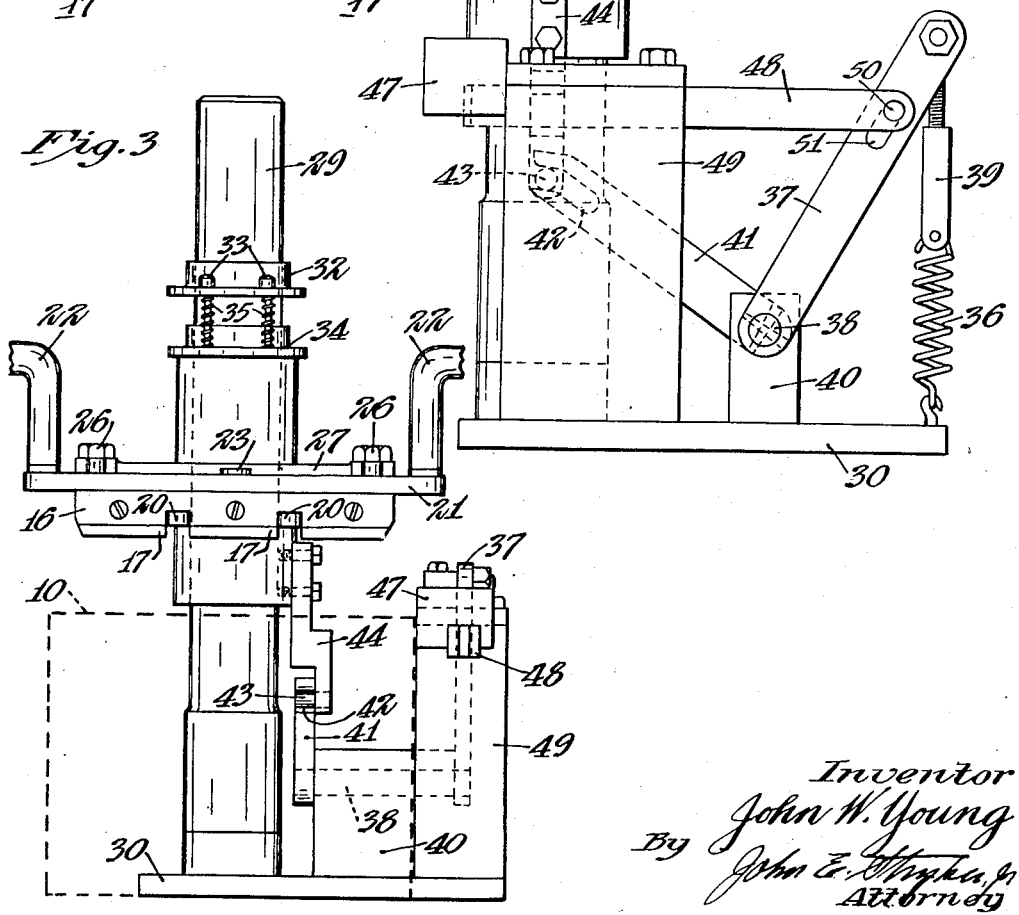

Dec. 9, 1941.         J. W. YOUNG              2,265,413
        JIG AND FORM FOR USE IN CONSTRUCTING STORAGE BATTERIES
           Original Filed Feb. 4, 1939      3 Sheets-Sheet 3
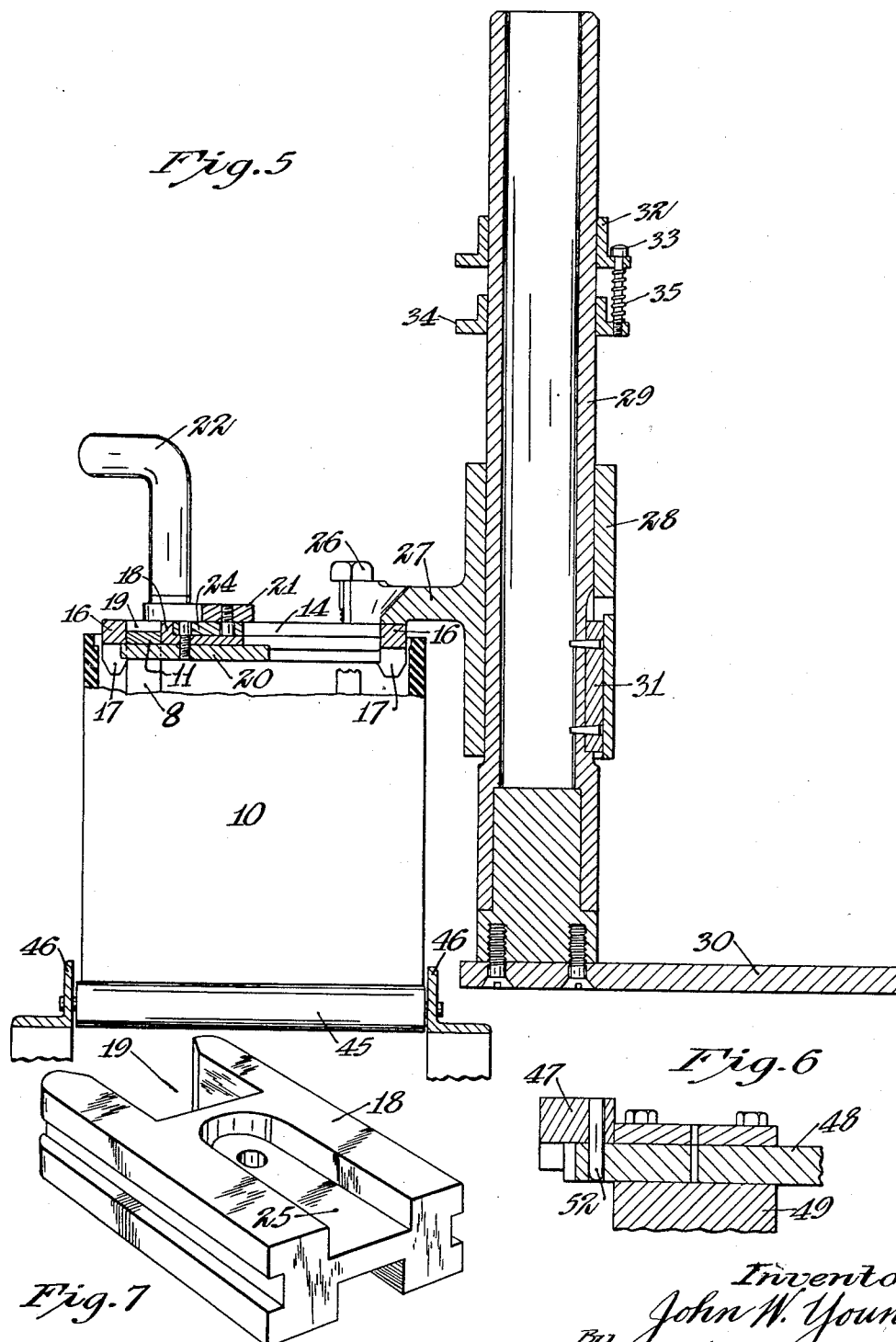

Patented Dec. 9, 1941

2,265,413

UNITED STATES PATENT OFFICE 2,265,413

JIG AND FORM FOR USE IN CONSTRUCTING STORAGE BATTERIES

John W. Young, Lancaster, N. Y., assignor to National Battery Company, St. Paul, Minn., a corporation of Delaware Continuation of application Serial No. 254,663, February 4, 1939. This application May 26, 1941, Serial No. 395,196

12 Claims. (Cl. 113—59)

This application is a continuation of an application filed on Feb. 4, 1939, Serial No. 254,663.

In the manufacture of certain types of storage batteries numerous members for electrically connecting groups of plates must be temporarily held in proper relationship to each other during the formation of the permanent fastenings and to meet the demand for uniformity in the product and economical and rapid assembly of such batteries I have devised the herein described clamping and forming mechanism which may be quickly attached to and detached from the battery parts.

It is an object of this invention to provide novel mechanism of this class.

A further object is to provide a jig and form adapted to simultaneously receive and hold all of the intercell posts in a battery container in proper relation to each other and to the container during the formation of the permanent connections between such posts.

Another object is to provide mechanism of this class adapted to be readily adjusted for use in constructing batteries of various sizes and shapes.

Other objects will appear and be more fully pointed out in the following specification and claims.

Referring to the accompanyinng drawings:

Fig. 2 is an end view of my device with the movable jig carrier in elevated position;

Fig. 3 is a front view, with the carrier in elevated position;

Fig. 5 is a vertical section taken on the line 5—5 of Fig. 1, but with the jig carrier lowered into the top of a battery;

Fig. 6 is a fragmentary vertical section taken on the line 6—6 of Fig. 1, and

Fig. 7 is a perspective view of one of the movable clamping and forming members of the jig.

Figure 1:
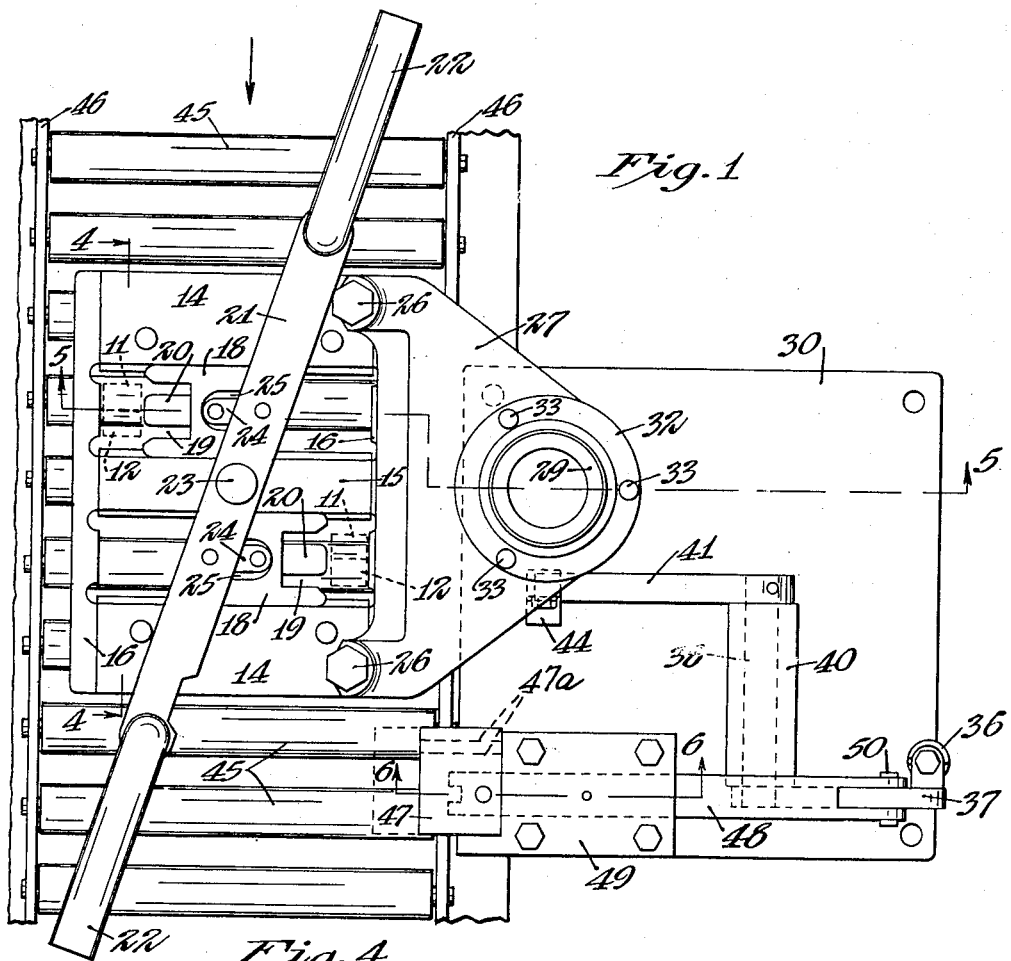
Figure 1 is a plan view of my improved jig and form, mounted adjacent to a battery assembly line conveyor.

My device is particularly although not exclusively adapted for use in making permanent connections between intercell posts, such as the posts 8 and 9 of a storage battery having a container 10 of the common three-cell type. The posts 8 and 9 have intercell connector members indicated by the numerals 11 and 12 which must be joined together above the intercell partitions indicated by the numeral 13. The battery illustrated has two pairs of the posts 8 and 9 and the posts of each pair have their upper ends integral respectively with the intercell connector members 11 and 12. My improved jig holds the several posts and connector members 11 and 12 firmly in place leaving the upper surfaces of the latter exposed for the application of a flame which fuses them together in pairs. The operation of making the intercell connections is preferably performed before the battery cover or separate cell covers (not shown) are placed in or on the container 10.

I provide a jig carrier frame having parallel end bars 14 and a center bar 15 rigidly joined together by side bars 16 to form a rectangular structure adapted to fit into the tops of the battery containers 10 successively. Beveled guide lugs 17 project down from the bars 16 to facilitate centering the frame in the battery containers. A pair of clamping heads, indicated generally by the numeral 18, are slidably mounted in the carrier frame. Each of these heads is formed with grooves in its opposite, longitudinal side edges to slidably receive tongues formed on the frame members 14 and 15. At one end each of the heads 18 has a rectangular opening 19 to receive and confine a pair of the posts 8 and 9 at three sides which are flat and disposed vertically. A supporting tongue 20 for a pair of the members 11 and 12 is also rigidly secured to each of the heads 18. As best shown in Fig. 1, the free or outer end of each head 18 and tongue 20 is beveled or tapered so that a pair of the intercell posts projecting up at the end of the head 18 may be clamped in the opening 19 by moving the head horizontally toward the posts while the posts are confined against movement away from the head by engagement with one of the frame bars 16. These bars 16 are recessed to receive the beveled ends of the tongues 20 and heads 18.

Figure 4:
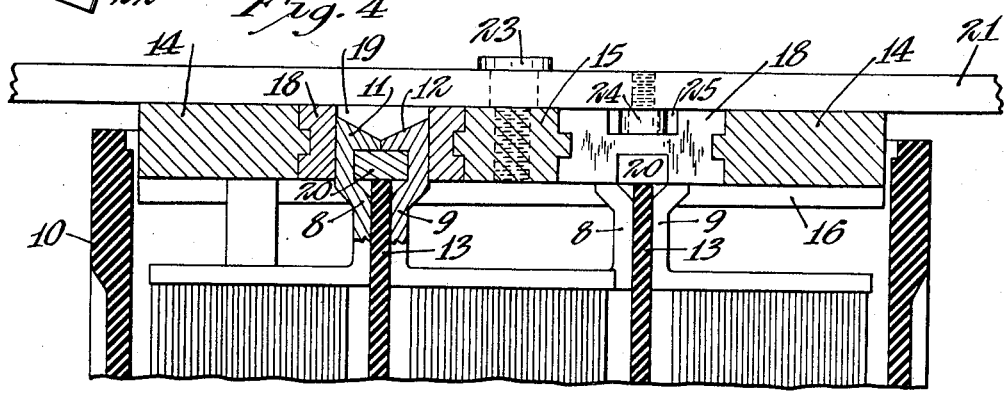
Fig. 4 is a fragmentary vertical section taken on the line 4—4 of Fig. 1 and also showing the upper portion of a battery with intercell connecting members in place in the jig.

To actuate the heads 18 I provide a horizontally extending lever 21 having handles 22 offset upward from opposite ends. This lever is pivoted on a vertical bolt 23 threaded in the bar 15 and has short links 24 connecting it respectively to the heads 18. The links 24 are mounted in recesses 25 formed in the heads 18 and project at opposite sides of the bolt 23. By pivoting the lever 21 in the appropriate direction the heads 18 are simultaneously actuated toward the respective pairs of intercell posts which have members 11 and 12 disposed in the openings between the bars 16 and heads 18, shown in dotted lines in Fig. 1. When the lever 21 is actuated in a counter-clockwise direction from the position shown in Fig. 1 the cell posts 8 and 9 and members 11 and 12 are securely clamped in the positions shown in Figs. 4 and 5.

The carrier frame, hereinbefore described, is detachably fastened by bolts 26 to a horizontally extending bracket 27. As best shown in Fig. 5, the bracket 27 is integral with a vertically elongated bearing 28 slidably embracing a post 29. This post is cylindrical and is rigidly supported at its lower end on a base plate 30. A key 31 projects from the periphery of the post 29 to slidably engage a keyway formed in and extending to the lower extremity of the bearing 28. The bracket 27 and mechanism supported thereby may be moved upward from the position shown in Fig. 5 until the key 31 passes out of engagement with the keyway in the bearing 28 and thereafter the bracket supporting the jig carrier may be turned to one side about the axis of the post 29. To limit upward movement of the bearing 28 a flanged collar 32 is secured to the post and is joined by three bolts 33 to a similar collar 34 which is slidable on the post and resiliently held in spaced relation to the collar 32 by helical springs 35 confined on the bolts 33 between the collars. The collar 32 is fixed in such position relative to the upper end of the bearing 28 that the latter in its upward movement strikes the collar 34 before the key way in the bearing 28 passes entirely out of engagement with the key 31. When it is desired to rotate the bracket 27 and jig carrier away from the path of the batteries, the bearing 28 is moved upward against the action of the springs 35 a sufficient distance to free the keyway from the key 31, then the bearing 28 is rotated so that the key 31, being out of alignment with its way, supports the jig carrier in elevated position.

To facilitate raising the jig carrier relative to the post 29 by relieving the operator of the weight of the mechanism, I provide a counterbalance comprising a tension spring 36 secured at one end to the base plate 30 and connected at the other end to suitable mechanism for imparting an upward thrust to the bearing 28. This mechanism comprises a crank arm 37 fixed at one end on a rock shaft 38 and having its other end connected by an adjustable link 39 to the upper end of the spring 36. The shaft 38 is supported in a bearing 40 mounted on the base plate 30. A second crank arm 41 is secured to the shaft 38 at one end and has a bifurcated end 42 slidably engaging a stud 43 projecting from an arm 44 depending from the bearing 28, as best shown in Figs. 2 and 3.

Batteries in the process of manufacture are moved along a conveyor 45 having parallel side rails 46 for guiding the batteries, one after another, beneath the jig carrier (Figs. 1 and 5). The batteries pass along the carrier 45 in the direction indicated by an arrow in Fig. 1 and are stopped beneath the jig by a stop member 47 mounted on a horizontally movable arm 48. The arm 48 is slidable longitudinally in a bearing 49 projecting up from the base plate 30 and has a bifurcated end connected by a pin 50 to the crank arm 37. The pin 50 is movable in an elongated slot 51 formed in the arm 37. As the jig carrier is moved down from its elevated position shown in Fig. 2, the stop arm 48 thrusts the member 47 into the path of a battery on the conveyor 45 so that the battery is stopped with its top opening in registry with the descending jig carrier.

My device is adapted for use with batteries of various sizes and shapes and the necessary adjustments may be made quickly and easily. Jig carriers of various sizes to fit in the top of several batteries to be constructed may be substituted one for the other on the bracket 27, the connections being made by the use of the bolts 26. To stop the batteries of different sizes in registry with the corresponding jig carrier, I provide stop members 47 of various dimensions longitudinally of the conveyor, as indicated by the dotted lines 47a, Fig. 1. To facilitate the substitution of one stop member for another, I construct the members 47 as illustrated in detail in Figs. 2, 3 and 6. The bottom of each stop member is slotted to receive the arm 48 and the latter is perforated vertically to receive and fit a stud 52 which is fixed in the member 47.

*Operation*

In operation, the batteries are fed to the jig along the conveyor 45 and approximate alignment with the carrier is maintained by the side rails 46. Assuming that the jig carrier is in the elevated position shown in Fig. 2, when a battery arrives beneath the jig the operator grasps the handles 22 and with the clamping heads 18 in the open position indicated in Fig. 1, presses down so that the bearing 28 slides down the post 29 while the stop member 47 is thrust toward the operator into the path of a battery on the conveyor. With the battery in engagement with the stop member 47 as indicated in dotted lines in Fig. 3 the carrier frame members 14 and 16 and guide lugs 17 are in registry with the top opening of the battery and further downward movement causes the intercell posts 8 and 9 and the connector members 11 and 12 to be received in the jig openings, as indicated in dotted lines in Fig. 1. With the jig carrier in fully depressed position, the operator merely pivots the lever 21 in counter-clockwise direction as viewed in Fig. 1 to clamp the posts and intercell connectors in the jig. The tongues 20 of the heads 18 pass beneath the connector members 11 and 12 while the vertical edges of such members and the vertical surfaces of the posts 8 and 9, at all four sides, are confined in the jig, leaving the top surfaces exposed for the application of heat sufficient to unite the connector members. With the members in the jig the heating or "burning" operation is performed quickly, whereupon the molten metal is allowed to solidify thus uniting the members. The operator finally withdraws the heads 18 by pivoting the lever 21 clockwise and then raises the jig carrier with the assistance of the spring 36. The operation of raising the carrier withdraws the stop member 47 from the path of the battery which is thereupon moved along the conveyor. In this manner the jig is used in succeeding batteries to quickly and uniformly construct the intercell connections.

It will be understood that the operation of uniting intercell posts is greatly facilitated and the time consumed in this work is greatly reduced by the use of my device. When the jig is not required and it is desired to entirely clear the conveyor for the production of other types of batteries, the jig carrier mounted on the bracket 27 is actuated forcibly upward to compress the springs 35 so that the key 31 passes otu of engagement with the keyway in the bearing 28 whereupon the latter, together with the jig carrier, is rotated about the axis of the post 29 to a position above the base plate 30 where the key 31 supports the mechanism in elevated and retracted position.

Having described my invention, what I claim as new and desire to protect by Letters Patent is:

1. In a jig for a storage battery having a container and a plurality of elements projecting up within said container, the combination with a jig frame formed to fit in the top of said container and having an opening to receive said elements, means movable in said frame for holding said battery elements together, a substantially vertical guide for movement of said frame to and from the top of said container, a substantially horizontal guide for the battery container beneath said frame and means for stopping the container in registry with said frame beneath the same.

2. In a jig for a storage battery having a container and a plurality of pairs of elements projecting up within said container, the combination with a jig frame formed to fit in the top of said container and having openings to receive said elements, means movable in said frame for holding said elements together in pairs, a substantially vertical guide for movement of said frame to and from the top of said container and a counterbalance tending to move said frame upward on said substantially vertical guide.

3. In a jig for a storage battery having a container and a plurality of pairs of elements projecting up within said container, the combination with a jig frame formed to fit in the top of said container and having openings to receive said elements, means movable in said frame for holding said elements together in pairs, a substantially vertical guide for movement of said frame to and from the top of said container, a substantially horizontal guide for said container beneath said frame, means for stopping the container in registry with said frame beneath the same on said horizontal guide and a counterbalance tending to move said frame upward on said substantially vertical guide.

4. In a jig for a storage battery having a container and a plurality of pairs of elements projecting up within said container, the combination with a jig frame formed to fit in the top of said container and having openings to receive said elements, means movable in said frame for holding said battery elements together in pairs, a substantially vertical guide for movement of said frame to and from the top of said container, a substantially horizontal guide for said container beneath said frame and means for guiding said frame to a position laterally of said substantially horizontal guide.

5. In a jig for a storage battery having a container and a plurality of pairs of elements projecting up within said container, the combination with a jig frame formed to fit in the top of said container and having openings to receive said elements, means movable in said frame for holding said battery elements together in pairs, a substantially vertical guide for movement of said frame to and from the top of said container, a substantially horizontal guide for said container beneath same frame, means for stopping the container on said substantially horizontal guide in registry with said frame beneath the same and means for guiding said frame to a position laterally of said substantially horizontal guide.

6. In a jig for a storage battery having a container and a plurality of pairs of posts projecting upwardly in said container to be joined together, the combination of a jig frame formed to fit in the top of said container and having openings, each adapted to receive a pair of said posts, clamping heads movable in said frame and formed to coact therewith in confining the sides of the posts in said openings, means for actuating said clamping heads to and from engagement with the posts, means for guiding said frame substantially vertically to and from the top of said container, means for guiding said container substantially horizontally along a determined path beneath said frame, a stop member movable into said path to arrest the container in registry with said frame and means operatively connecting said stop member to said frame whereby said stop member is projected into said path upon the lowering of said frame.

7. In a jig for forming intercell connectors in situ within a storage battery container having an open top, a partition dividing the container into cells, a multiplicity of plates and separators in each cell and a pair of posts severally connected to groups of plates in the respective cells and projecting up at opposite sides of said partition, the improvements which comprise, a frame fitting within and below the top of said container and having an opening to receive said posts, a fixed member of said frame fitting between said posts and a wall of the container, a clamping head slidable on said frame within said opening and extending below the top of the container walls, said head having spaced parallel side bars movable longitudinally to and from said frame member and formed to fit and confine opposite, outer surfaces of said posts respectively, a tongue projecting from said head between said side bars and movable therewith above said partition to form a mold bottom adapted to abut against the inner opposed surfaces of said posts respectively and against said frame member, a mold recess being formed in said head above said tongue to shape an inter-cell connector in situ and means for forcibly actuating said head to and from engagement with said posts and frame member.

8. In a jig for forming intercell connectors in situ within a storage battery container having a rectangular open top, a partition dividing the container into cells, the upper edge of said partition being below the upper edges of the container walls, a multiplicity of plates and separators in each cell and a pair of posts severally connected to groups of plates in the respective cells and projecting up at opposite sides of said partition, the improvements which comprise, a frame fitting within the top of said container and movable downward therein at least to the upper edge of said partition, said frame having an opening to receive said posts, a fixed member of said frame fitting between said posts and a wall of the container and extending across said partition, a clamping head slidable horizontally on said frame within said opening, the lower face of said head extending below the top of the container walls, spaced parallel side bars integral with said head, movable longitudinally to and from said frame member and formed to fit and confine opposite, outer surfaces of said posts respectively, a tongue projecting from said head between said side bars and movable therewith along the upper edge of said partition to form a mold bottom adapted to engage the inner opposed surfaces of said posts respectively and to abut against said frame member, a mold recess being formed in said head above said tongue to shape an inter-cell connector in situ and means for forcibly actuating said head to and from engagement with said posts and frame member.

9. In a jig for forming intercell connectors in situ within a storage battery container having an open top, partitions dividing said container into at least three cells, a multiplicity of plates and separators within each cell and a pair of posts severally connected to groups of plates in the adjoining cells and projecting up at opposite sides of each of said partitions, one pair of posts being located near one side wall of the container and the other pair being located near the opposite side wall thereof, the improvements which comprise, a frame fitting within and below the top of said container and having separate openings to receive the pairs of posts respectively, clamping heads slidable horizontally in said frame openings to and from opposite walls of the container respectively, each of said heads being formed to clamp opposite outer surfaces of the posts of a pair, a tongue projecting horizontally from each of said heads and movable therewith to fit between the posts of a pair, said tongues constituting the bottom of intercell connector molds, mold recesses being formed in said heads above the tongues thereof to shape an intercell connector in situ and means for forcibly actuating said heads in opposite directions to and from engagement with said posts of the respective pairs 10. The jig described in claim 7 in which said means for forcibly actuating said heads in opposite directions comprise a lever pivoted on a vertical fulcrum on said frame and means connecting said heads to said lever at opposite sides of the fulcrum.

11. In a jig for forming intercell connectors in situ within a storage battery container having an open rectangular top, parallel partitions dividing said container into at least three cells, a multiplicity of plates and separators within each cell and a pair of posts severally connected to groups of plates in the adjoining cells and projecting up at opposite sides of each of said partitions, one pair of posts being located near one side wall of the container and the other pair being located near the opposite side wall thereof, the improvements which comprise, a frame fitting within and below the top of said container and having separate openings to receive the pairs of posts respectively, a fixed member of said frame fitting between each pair of said posts and the adjacent wall of the container, clamping heads slidable in said frame openings to and from said frame members respectively, each of said heads being formed with parallel side bars adapted to fit and confine opposite outer surfaces of the posts of a pair, a tongue projecting from each of said heads between the side bars thereof and movable therewith along the top of a partition to engage one of said frame members, said tongues constituting the bottom of intercell connector molds in engagement with the inner surfaces of the posts of the respective pairs, mold recesses being formed in said heads above the tongues thereof to shape intercell connectors in situ, means connecting said heads for movement in unison and in opposite directions and means for forcibly actuating said heads in opposite directions to and from engagement with said posts and frame members respectively.

12. The jig described in claim 7 in which said means for connecting said clamping heads together for movement in unison comprises a horizontally movable lever pivoted centrally on said frame and means joining said heads to said lever at points equally spaced from the lever fulcrum and at opposite sides thereof.

JOHN W. YOUNG.